Oct. 13, 1925.
W. S. PRITCHARD
1,556,627
METHOD OF FORMING TUBING AND APPARATUS THEREFOR
Filed May 28, 1923
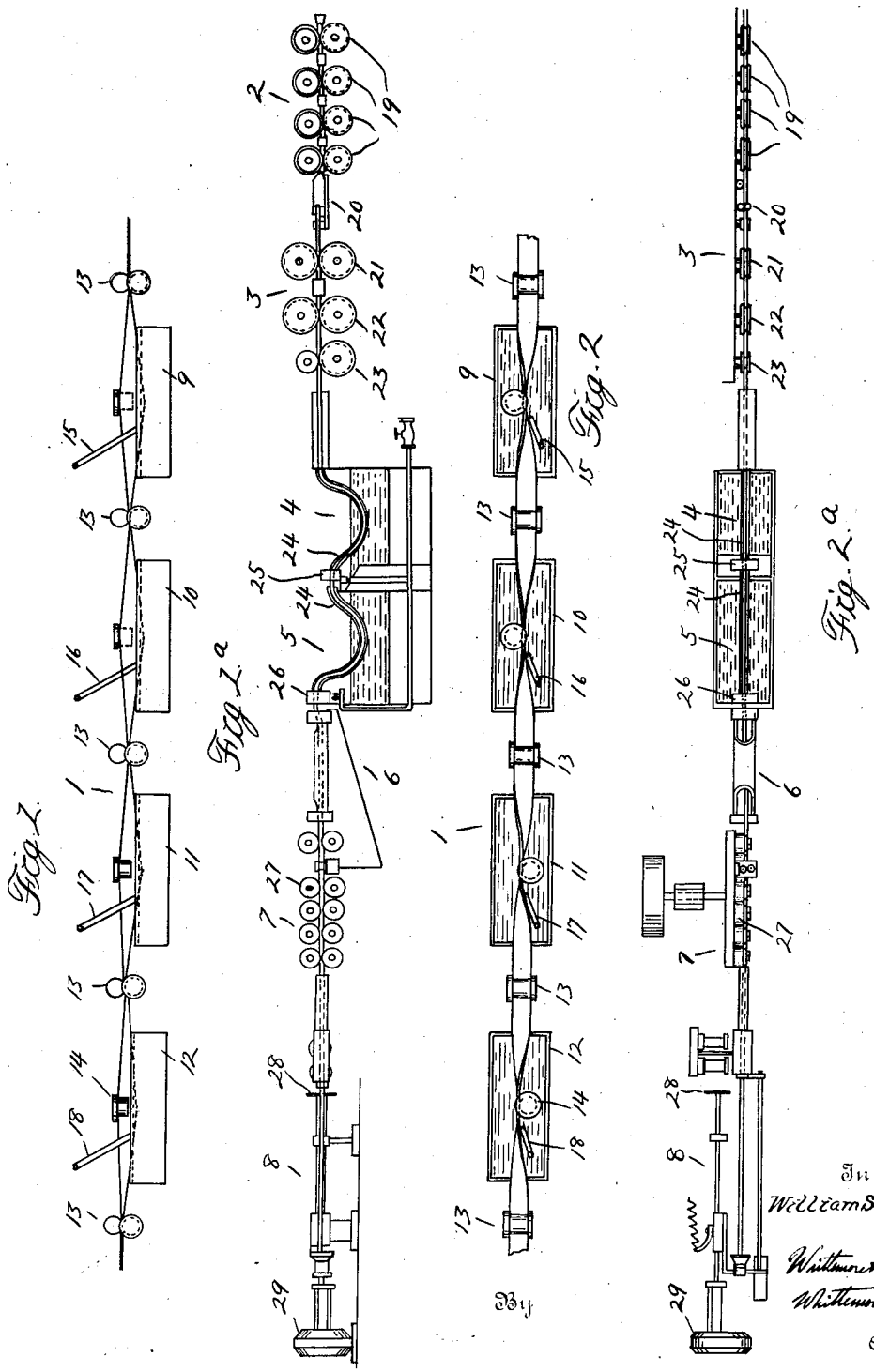

Patented Oct. 13, 1925.

1,556,627

UNITED STATES PATENT OFFICE.

WILLIAM S. PRITCHARD, OF DETROIT, MICHIGAN, ASSIGNOR TO MOTOR PRODUCTS CORPORATION, (1923), OF DETROIT, MICHIGAN, A CORPORATION OF NEW YORK.

METHOD OF FORMING TUBING AND APPARATUS THEREFOR.

Application filed May 28, 1923. Serial No. 642,121.

*To all whom it may concern:*

Be it known that I, WILLIAM S. PRITCHARD, a citizen of the United States of America, residing at Detroit, in the county of Wayne and State of Michigan, have invented certain new and useful Improvements in Methods of Forming Tubing and Apparatus Therefor, of which the following is a specification, reference being had therein to the accompanying drawings.

The invention relates to the manufacture of metallic tubing and refers particularly to the manufacture of soldered lock-seam tubing formed from a sheet metal ribbon. The invention has among its objects the provision of an organized mechanism in which during the continuous advancement of the sheet metal ribbon the successive steps of tinning or coating with solder the edges of the ribbon, forming the ribbon into lock seam tubing, soldering the lock seam tubing and severing the soldered lock seam tubing into predetermined lengths are effected. Other objects of the invention reside in the novel arrangement and combination of parts as more fully hereinafter set forth.

In the drawings:

Figures 1 and 1ᵃ are respectively diagrammatic sectional side views of separated portions of a machine embodying my invention; and Figs. 2 and 2ᵃ are respectively diagrammatic plan views thereof.

1 is the mechanism for tinning or coating with solder the sheet metal ribbon. 2 is the tube forming mechanism operating upon the tinned sheet metal ribbon to form the seam into a lock seam tubing and 3 the straightening mechanism operating upon the lock seam tubing to straighten the same. 4 and 5 are respectively the flux and solder baths through which the lock seam tubing successively passes, 6 is the cooling mechanism for directing a cooling medium, such as water, upon the soldered lock seam tubing, and 7 is the straightening mechanism operating upon the soldered lock seam tubing after passing through the cooling mechanism. For severing the soldered lock seam tubing to predetermined lengths I have provided the severing mechanism 8.

For the purpose of tinning the edges only of the sheet metal ribbon prior to forming the same into tubing and at the same time performing the tinning operation during the continuous advancement of the sheet metal ribbon through the machine, I have provided the spaced receptacles 9 and 10 containing a suitable cleaning fluid or acid and also the spaced receptacles 11 and 12 containing molten solder. The upper ends of these receptacles are open so that the edges of the sheet metal ribbon may be deflected thereinto into contact with either the acid or solder. The sheet metal ribbon passes between the series of pairs of horizontally journalled rolls 13 located beyond the ends of each receptacle and arranged at a height such that the portions of the ribbon passing through these series of pairs of cooperating rolls are located slightly above the upper ends of the receptacles. For deflecting the ribbon into the receptacles I provide above each receptacle the vertically journalled roll 14 having an annular flange at its upper end, this roll engaging the portion of the ribbon intermediate adjacent pairs of cooperating rolls to warp or rotate the same through an angle of 90 degrees whereby the lower edge of this middle portion of the ribbon extends downwardly into the open upper end of the receptacle and into contact with the material in that receptacle. As shown, the sheet metal ribbon is warped or rotated through an angle of 90 degrees in one direction to bring one edge into engagement first with the acid in the receptacle 9 and then the sheet metal ribbon is warped or rotated through an angle of 90 degrees in the opposite direction to bring its other edge into engagement with the acid in the receptacle 10. This sheet metal ribbon is also warped or rotated in the same manner to bring its opposite edges successively into contact with the molten solder in the receptacles 11 and 12. For removing surplus acid and solder, I have provided the air pipes 15, 16, 17 and 18 for directing compressed air successively against the edges of the sheet metal ribbon as they emerge from the materials in the receptacles 9, 10, 11 and 12 respectively.

After passing through the tinning mechanism the sheet metal ribbon having tinned edges passes through the tube-forming mechanism 2, comprising the continuously driven pairs of cooperating forming rolls 19 which successfully operate upon the ribbon to bend the same into a U-shaped cross section and to form on the edge portions thereof hooked flanges. The U-shaped strip is then closed and its hooked flanges are engaged and the seam pressed into locking engagement while the ribbon is passing through the mandrel holder 20 and around a mandrel within this holder. 21 and 22 are pairs of cooperating rolls engaging the comparatively closed tube and preferably driven continuously at slightly greater peripheral speed than the pairs of cooperating rolls of the tube-forming mechanism 2 to remove any bulge in the tubing and to straighten the same. The upper roll of the first pair of cooperating rolls 21 preferably has a roughened or knurled surface which is engageable only with the seam of the tubing thereby making the seam tighter and at the same time providing better traction upon the tubing.

Prior to passing through the flux and solder baths, the forward end of the tubing is closed by suitable means such as the pair of cooperating rolls 23 provided with cooperating projections for nesting one-half of the wall of the tubing into the other half, without changing the radius of the other half. The tubing is deflected into and out of both the flux and solder baths by means of the guide tubes 24 which curve downwardly into and outwardly from the flux and solder baths and are apertured to permit the flux and molten solder to pass thereinto and into contact with the tubing.

At the rear ends of both the flux and solder baths suitable wipers 25 and 26 are respectively provided for removing surplus flux and solder respectively, these wipers in the present instance being preferably chambers through which the tubing passes and having provision for directing heated compressed air upon the tubing.

After the tubing has passed through the cooling mechanism 6 in which a cooling medium, such as water, is directed against the tubing, it is passed through the straightening mechanism 7 which comprises the pairs of cooperating rolls 27 for straightening the tubing after it passes through the preceding mechanisms. This series of rolls is continuously driven at a slightly greater peripheral speed than the pairs of cooperating rolls 20 and 21, whereby tension is applied to the tubing to assist in drawing the same through the flux mechanism and the soldering mechanism as well as the tube forming mechanism and tinning mechanism.

Beyond the straightening mechanism is the tube severing mechanism 8, which comprises the rotary saw 28, driven by the electric motor 29. The tubing as it is advanced a predetermined distance is moved across the saw and thereby cut into predetermined lengths.

From the above description it will be readily seen that I have provided organized mechanisms in which a sheet metal ribbon of indeterminate length is continuously advanced and during its advancement its edges are tinned and it is formed into lock seam tubing, the lock seam tubing is soldered and the soldered lock seam tubing is severed to predetermined lengths. Owing to the fact that the sheet metal ribbon has its edges tinned prior to its being formed into tubing a tighter seam is secured. Also with this arrangement of machine the soldering material on the edges of the sheet metal ribbon is melted during the passage of the lock seam tubing through the solder bath, which latter assists in making a better sealed seam as well as provides a deposit of solder upon the outer periphery of the tubing which is useful for connecting the radiator fins to the tubing.

What I claim as my invention is:

1. In the method of forming tubing, the advancing of a metallic ribbon and during the advancement the successive steps of tinning an edge of the ribbon, forming the ribbon into lock-seam tubing, and sealing the lock seam by applying heat sufficient to melt the tinning material.

2. In the method of forming tubing, the advancing of a metallic ribbon and during the advancement the successive steps of tinning an edge of the ribbon, forming the ribbon into tubing, and passing the tubing through a solder bath.

3. In the method of forming tubing, the advancing of a metallic ribbon and during the advancement the successive steps of tinning an edge of the ribbon, forming the ribbon into tubing, and passing the tubing through a solder bath.

4. In the method of forming tubing, the advancing of a metallic ribbon and during the advancement the steps of tinning an edge of the ribbon, forming the ribbon into lock-seam tubing, sealing the lock seam by applying heat sufficient to melt the tinning material, and finally severing the tubing to predetermined lengths.

5. In the method of forming tubing, the step of continually advancing a metallic ribbon and during the continuous advancement the successive steps of tinning an edge of the ribbon, forming the ribbon into tubing, passing the tubing through a solder bath, and finally severing the tubing to predetermined lengths.

6. In the method of forming tubing, the step of continually advancing a metallic strip and during the continuous advancement the warping of a portion of the metallic strip to deflect one edge thereof into contact with a material in an open upper-ended receptacle, and the subsequent forming of the metallic strip into tubing with the deflected edge thereof adjacent to another portion of the metallic strip.

7. In the method of forming tubing, the advancing of a metallic ribbon in a normally horizontal position and during the advancement the warping or rotating of portions of the ribbon to bring an edge thereof into a position lower than the normal horizontal position of said ribbon and into contact with a material which adheres thereto, and the subsequent forming of the ribbon into tubing with the edge to which the material adheres adjacent to another portion of the ribbon.

8. In a machine for forming tubing, the combination with an open upper-ended receptacle containing a cleaning fluid and an open upper-ended receptacle in rear of said first-mentioned receptacle and containing molten solder, of a series of pairs of horizontally journaled cooperating rolls at the ends of said receptacle for guiding the ribbon, and a series of vertically journaled rolls above said receptacles and engageable with the portion of the ribbon intermediate adjacent pairs of said first-mentioned rolls for warping or rotating the ribbon and deflecting an edge thereof into the cleaning fluid and solder.

9. In the method of forming tubing, the advancing of a metallic ribbon and during the advancement the successive steps of tinning a longitudinally extending portion of the ribbon, forming the ribbon into tubing, and applying heat sufficient to melt the tinning material.

10. In a machine for forming tubing, the combination with an open upper-ended receptacle containing a suitable adhesive material, of horizontal means at the ends of said receptacle for guiding the ribbon, and vertically extending means above the receptacle and engageable with the portion of the ribbon intermediate the adjacent horizontally extending ribbon guiding means for warping or rotating the ribbon and deflecting an edge thereof into said adhesive material.

In testimony whereof I affix my signature.

WILLIAM S. PRITCHARD.